(12) United States Patent
Nishikawa et al.

(10) Patent No.: US 10,050,798 B2
(45) Date of Patent: Aug. 14, 2018

(54) CRYPTOGRAPHIC BLOCK IDENTIFICATION APPARATUS, CRYPTOGRAPHIC BLOCK IDENTIFICATION METHOD, AND NON-TRANSITORY COMPUTER READABLE RECORDING MEDIUM STORING CRYPTOGRAPHIC BLOCK IDENTIFICATION PROGRAM

(71) Applicant: MITSUBISHI ELECTRIC CORPORATION, Tokyo (JP)

(72) Inventors: Hiroki Nishikawa, Tokyo (JP); Takumi Yamamoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/544,982

(22) PCT Filed: Feb. 6, 2015

(86) PCT No.: PCT/JP2015/000547
§ 371 (c)(1),
(2) Date: Jul. 20, 2017

(87) PCT Pub. No.: WO2016/125205
PCT Pub. Date: Aug. 11, 2016

(65) Prior Publication Data
US 2018/0019883 A1    Jan. 18, 2018

(51) Int. Cl.
*H04L 9/36* (2006.01)
*H04L 9/06* (2006.01)
*G06F 21/56* (2013.01)

(52) U.S. Cl.
CPC .............. *H04L 9/36* (2013.01); *G06F 21/566* (2013.01); *H04L 9/0618* (2013.01)

(58) Field of Classification Search
None
See application file for complete search history.

(56) References Cited

U.S. PATENT DOCUMENTS 9,680,848 B2 *  6/2017  Kim ..................... H04L 63/1416
9,734,332 B2 *  8/2017  Huang .................. G06F 21/562
(Continued)

FOREIGN PATENT DOCUMENTS

JP       2009-181335 A     8/2009
JP        2011-13917 A     1/2011
(Continued)

OTHER PUBLICATIONS

Uto, Nelson, A Methodology for Retrieving Information from Malware Encrypted Output Files: Brazilian Case Studies. Future Internet 2013. Feb. 18, 2013. po. 140-167. (Year: 2013).*

(Continued)

*Primary Examiner* — Michael R Vaughan
(74) *Attorney, Agent, or Firm* — Birch, Stewart, Kolasch & Birch, LLP

(57) ABSTRACT

The present invention relates to a cryptographic block identification apparatus which, in order to analyze encryption logic used by malware to conceal communication, identifies a cryptographic block where encryption logic is stored within a program of the malware. The cryptographic block identification apparatus includes a block candidate extraction part and a cryptographic block identification part. The block candidate extraction part analyzes an execution trace in which an execution step of malware is recorded, calculates an evaluation value representing cipher likeliness of the execution step based on whether or not an operation type that characterizes cipher likeliness of the execution step is included in the execution step, and extracts an execution step where the evaluation value exceeds a threshold L, as a block candidate which is a candidate of a cryptographic (Continued)

block. The cryptographic block identification part identifies a region of the execution trace in which the block candidates are consecutive beyond a threshold M, as a cryptographic block.

10 Claims, 20 Drawing Sheets

(56) References Cited

U.S. PATENT DOCUMENTS

| | | | | |
|---|---|---|---|---|
| 9,860,262 | B2* | 1/2018 | Mainieri | H04L 63/1425 |
| 2013/0326625 | A1* | 12/2013 | Anderson | G06F 21/56 726/23 |
| 2014/0090061 | A1* | 3/2014 | Avasarala | G06F 21/56 726/24 |
| 2016/0094572 | A1* | 3/2016 | Tyagi | H04L 63/1425 726/23 |
| 2016/0203318 | A1* | 7/2016 | Avasarala | G06F 21/56 726/23 |
| 2016/0277423 | A1* | 9/2016 | Apostolescu | H04L 63/145 |
| 2017/0337378 | A1* | 11/2017 | Yamamoto | G06F 21/567 |

FOREIGN PATENT DOCUMENTS

| | | | | |
|---|---|---|---|---|
| JP | 2011-154727 | A | | 8/2011 |
| JP | 2012-103893 | A | | 5/2012 |
| JP | 2012-194814 | A | | 10/2012 |
| JP | 2013-114637 | A | | 6/2013 |
| JP | 2013114637 | A | * | 6/2013 |
| JP | 2013-218444 | A | | 10/2013 |
| JP | 2014-85772 | A | | 5/2014 |

OTHER PUBLICATIONS

Wressnegger, Christian et al. Deobfuscating Embedded Malware using Probable-Plaintext Attacks. Proceeding RAID 2013 Proceedings of the 16th International Symposium on Research in Attacks, Intrusions, and Defenses—vol. 8145 pp. 164-183 (Year: 2013).*

Calvet et al., "Aligot: Crytographic Function Identification in Obfuscated Binary Programs", Proceedings of the 19th ACM Conference on Computer and Communications Security, 2012, CCS 2012, 14 pages.

Groöbert, "Automated Identification of Cryptographic Primitives in Binary Programs", Published in: Proceeding RAID'11 Proceedings of the 14th international confernce on Recenr Advances in Intrusion Detection, Menlo Park, CA—Sep. 20-21, 2011, 21 pages.

Li et al., "CipherXRay: Exposing Cryptographic Operations and Transient Secrets from Monitored Binary Execution", IEEE Transactions on Dependable and Secure Computing, Mar./Apr. 2014, vol. 11, No. 2, pp. 101-114.

Lutz, "Towards Revealing Attackers' Intent by Automatically Decrypting Network Traffic", Master Thesis MA-Aug. 2008, Jan. 2008-Jul. 2008, 53 pages.

Matenaar et al., "CIS: The Crypto Intelligence System for Automatic Detection and Localization of Cryptographic Function in Current Malware", Published in: Proceeding MALWARE '12 Proceedings of the 2012 7th International Conference on Malicious and Unwanted Software (MALWARE), Oct. 16-18, 2012, 9 pages.

Nishikawa et al., "Light Weight Identification Cryptographic Block Using Features on Cryptographic Functions", IPSJ SIG Notes, Multimedia Tsushin to Bunsan Sheri (DPS), Feb. 26, 2015, 2015-DPS-162, No. 26, pp. 1-7, retrieval date Apr. 2, 2015, Internet <URL:https://ipsj.ixsq.nii.ac.jp/ej/?action=pages_view_main &active_action=repository_view_main_item_detail &item_id=113569&item_no=1&page_id=13&block_id=8>.

Wang et al., "ReFormat: Automatic Reverse Engineering of Encrypted Messages", Proceedings of the 14th European Conference on Research in Computer Security, ESORICS'09, 2009, 16 pages.

Yamamoto et al., "Proposal and Cryptographic Function Identification (part 2)", 2015 Nen Symposium on Cryptography and Information Security, Jan. 20, 2015, 2A1-1, pp. 1 to 6.

Yozawa et al., "Managed Security Service Front Line 6th Series", Business Communication, Jun. 1, 2014, vol. 51, No. 6, total 9 pages, pp. 6-9.

* cited by examiner

Fig. 3

| INSTRUCTION ADDRESS | INSTRUCTION (OPCODE) | INSTRUCTION TARGET (OPERAND) | MEMORY/REGISTER ACCESS INFORMATION |
|---|---|---|---|

Fig. 4

401055!mov esi, ecx!RR_ecx_63c02188!WR_esi_63c02188
401057!shr esi, 0x5!RR_esi_63c02188!WR_esi_31e010c
40105a!add esi, dword ptr [ebp-0x8]!RM_12ff14_4_deadbee4!RR_ebp_12ff1c_esi_31e010c!
      WR_esi_e1cbbff0
40105d!mov edi, ecx!RR_ecx_63c02188!WR_edi_63c02188
40105f!shl edi, 0x4!RR_edi_63c02188!WR_edi_3c021880
401062!add edi, dword ptr [ebp-0xc]!RM_12ff10_4_deadbee3!RR_ebp_12ff1c_edi_3c021880!
      WR_edi_1aafd763
401065!xor esi, edi!RR_esi_e1cbbff0_edi_1aafd763!WR_esi_fb646893
401067!lea edi, ptr [edx+ecx*1]!RR_ecx_63c02188_edx_28b7bd67!WR_edi_8c77deef
40106a!xor esi, edi!RR_esi_fb646893_edi_8c77deef!WR_esi_7713b67c
40106c!sub eax, esi!RR_eax_a3651d14_esi_7713b67c!WR_eax_2c516698
40106e!mov esi, eax!RR_eax_2c516698!WR_esi_2c516698

Fig. 5

| BLOCK CANDIDATE ID | BLOCK CANDIDATE |
|---|---|

Fig. 6

| BLOCK CANDIDATE ID | BLOCK CANDIDATE |
|---|---|
| 5 | 40105f!shl edi, 0x4!RR_edi_63c02188!WR_edi_3c021880 |
| 6 | 401062!add edi, dword ptr [ebp-0xc]!RM_12ff10_4_deadbee3!RR_ebp_12ff1c_edi_3c021880!WR_edi_1aafd763 |
| 7 | 401065!xor esi, edi!RR_esi_e1cbbff0_edi_1aafd763!WR_esi_fb646893 |
| 10 | 40106c!sub eax, esi!RR_eax_a3651d14_esi_7713b67c!WR_eax_2c516698 |

Fig. 7

| BLOCK ID | START ADDRESS | END ADDRESS | BLOCK SIZE | INSTRUCTION STRING CONSTITUTING BLOCK |
|---|---|---|---|---|

Fig.10

| BLOCK CANDIDATE ID | INSTRUCTION EXISTS | QUEUE (FORWARD DIRECTION) | F(T) (FORWARD DIRECTION) |
|---|---|---|---|
| 0 | | 0 | 0 |
| 1 | O | 5 | 5 |
| 2 | | 4 | 4 |
| 3 | O | 3, 5 | 8 |
| 4 | O | 2, 4, 5 | 11 |
| 5 | O | 1, 3, 4, 5 | 13 |
| 6 | O | 2, 3, 4, 5 | 14 |
| 7 | O | 1, 2, 3, 4, 5 | 15 |
| 8 | O | 1, 2, 3, 4, 5 | 15 |
| 9 | | 1, 2, 3, 4 | 10 |
| 10 | | 1, 2, 3 | 6 |
| 11 | | 1, 2 | 3 |
| 12 | O | 1, 5 | 6 |
| 13 | O | 4, 5 | 9 |
| 14 | | 3, 4 | 7 |
| 15 | O | 2, 3, 5 | 10 |
| 16 | | 1, 2, 4 | 7 |
| 17 | | 1, 3 | 4 |
| 18 | | 2 | 2 |
| 19 | | 1 | 1 |
| 20 | | 0 | 0 |
| 21 | | 0 | 0 |
| 22 | O | 5 | 5 |
| 23 | | 4 | 4 |
| 24 | | 3 | 3 |
| 25 | O | 2, 5 | 7 |
| 26 | | 1, 4 | 5 |
| 27 | | 3 | 3 |
| 28 | | 2 | 2 |
| 29 | O | 1, 5 | 6 |
| 30 | | 4 | 4 |

Fig.11

| BLOCK CANDIDATE ID | BLOCK CANDIDATE |
|---|---|
| 4 | - - - |
| 5 | - - - |
| 6 | - - - |
| 7 | - - - |
| 8 | - - - |
| 9 | - - - |
| 13 | - - - |
| 15 | - - - |

Fig.13

| BLOCK CANDIDATE ID | INSTRUCTION EXISTS | QUEUE (REVERSE DIRECTION) | F(T) (REVERSE DIRECTION) |
|---|---|---|---|
| 0 |  | 1, 2, 4 | 7 |
| 1 | ○ | 1, 2, 3, 5 | 11 |
| 2 |  | 1, 2, 3, 4 | 10 |
| 3 | ○ | 1, 2, 3, 4, 5 | 15 |
| 4 | ○ | 1, 2, 3, 4, 5 | 15 |
| 5 | ○ | 2, 3, 4, 5 | 14 |
| 6 | ○ | 3, 4, 5 | 12 |
| 7 | ○ | 4, 5 | 9 |
| 8 | ○ | 1, 5 | 6 |
| 9 |  | 1, 2 | 3 |
| 10 |  | 2, 3 | 5 |
| 11 |  | 1, 3, 4 | 8 |
| 12 | ○ | 2, 4, 5 | 11 |
| 13 | ○ | 3, 5 | 8 |
| 14 |  | 4 | 4 |
| 15 | ○ | 5 | 5 |
| 16 |  | 0 | 0 |
| 17 |  | 0 | 0 |
| 18 |  | 1 | 1 |
| 19 |  | 2 | 2 |
| 20 |  | 3 | 3 |
| 21 |  | 1, 4 | 5 |
| 22 | ○ | 2, 5 | 7 |
| 23 |  | 3 | 3 |
| 24 |  | 4 | 4 |
| 25 | ○ | 1, 5 | 6 |
| 26 |  | 2 | 2 |
| 27 |  | 3 | 3 |
| 28 |  | 4 | 4 |
| 29 | ○ | 5 | 5 |
| 30 |  | 0 | 0 |

Fig.14

| BLOCK CANDIDATE ID | BLOCK CANDIDATE |
|---|---|
| 1 | - - - |
| 2 | - - - |
| 3 | - - - |
| 4 | - - - |
| 5 | - - - |
| 6 | - - - |
| 7 | - - - |
| 8 | - - - |
| 9 | - - - |
| 12 | - - - |
| 13 | - - - |
| 15 | - - - |

Fig.15

| BLOCK CANDIDATE ID | INSTRUCTION EXISTS | F(T) ADDITION RESULT |
|---|---|---|
| 0 |  | 7 |
| 1 | ○ | 16 |
| 2 |  | 14 |
| 3 | ○ | 23 |
| 4 | ○ | 26 |
| 5 | ○ | 27 |
| 6 | ○ | 26 |
| 7 | ○ | 24 |
| 8 | ○ | 21 |
| 9 |  | 13 |
| 10 |  | 11 |
| 11 |  | 11 |
| 12 | ○ | 17 |
| 13 | ○ | 17 |
| 14 |  | 11 |
| 15 | ○ | 15 |
| 16 |  | 7 |
| 17 |  | 4 |
| 18 |  | 3 |
| 19 |  | 3 |
| 20 |  | 3 |
| 21 |  | 5 |
| 22 | ○ | 12 |
| 23 |  | 7 |
| 24 |  | 7 |
| 25 | ○ | 13 |
| 26 |  | 7 |
| 27 |  | 6 |
| 28 |  | 6 |
| 29 | ○ | 11 |
| 30 |  | 4 |

CRYPTOGRAPHIC BLOCK IDENTIFICATION APPARATUS, CRYPTOGRAPHIC BLOCK IDENTIFICATION METHOD, AND NON-TRANSITORY COMPUTER READABLE RECORDING MEDIUM STORING CRYPTOGRAPHIC BLOCK IDENTIFICATION PROGRAM

TECHNICAL FIELD

The present invention relates to a cryptographic block identification apparatus which, in order to analyze encryption logic used by malware to conceal communication, identifies a cryptographic block where the encryption logic is stored within a program of the malware.

BACKGROUND ART

In recent years, a targeted attack which is aimed at a specific organization and performs persistent attack is becoming worse, posing a security threat. In the targeted attack, mail is sent to a target organization to infect the terminal of the target organization with malware. The infecting malware communicates with an external attacker server from within the organization to download an attack program and steal information in the organization system.

Technologies to identify which information has been leaked by malware have attracted attention against the backdrop of severe damage of information leakage caused by malware infection. When identifying information that actually leaked, the logs generated by devices such as a personal computer and a server are analyzed to reveal the activities of the malware.

However, some recent malware use encryption technology to conceal the communication. Such malware communication cannot be analyzed as they are, making it difficult to reveal what the malware does.

Therefore, it is necessary to identify the encryption logic used by the malware for concealing communication and the key of the encryption logic, and decrypt the encrypted communication. Ordinarily, this task needs analyzing the machine language of the malware, that is, binary data, and requires enormous labor and time. To cope with this, methods disclosed in, for example, the following Patent Document 1, Non-Patent Document 1, and Non-Patent Document 2 are available as a conventional technique for identifying the encryption logic and its key.

According to Patent Literature 1, an execution trace of an instruction executed by malware is recorded in order to identify an encryption key of the malware which has an encryption function inside, encrypts information, and uploads the encrypted information. The recorded execution trace is analyzed including arithmetic data, thereby identifying the key.

Non-Patent Literature 1 and Non-Patent Literature 2 propose a technique of analyzing an execution trace being a log obtained by executing malware, to identify encryption logic used by malware.

Non-Patent Literature 1 identifies a cryptographic block by calculating the ratio of bit operations and logic operations in an execution trace by utilizing the fact that the cryptographic processing involves many arithmetic operations and bit operations.

In Non-Patent Literature 2, using a feature that cryptographic processing often encrypts information by repeatedly performing the same process, a loop which is a repetition of the same process is detected from an execution trace, so that the cryptographic block is identified.

CITATION LIST

Patent Literature

Patent Literature 1: JP 2013-114637

Non-Patent Literature

Non-Patent Literature 1: Zhi Wang, Xuxian Jiang, Weidong Cui, Xinyuan Wang and Mike Grace, ReFormat: automatic reverse engineering of encrypted messages, Proceedings of the 14th European Conference on Research in Computer Security, ESORICS'09 2009.

Non-Patent Literature 2: Joan Calvet, Jose M. Fernandez, Jean-Yves Marion, Aligot: Cryptographic Function Identification in Obfuscated Binary Programs, Proceedings of the 19th ACM Conference on Computer and Communications Security, CCS 2012.

SUMMARY OF INVENTION

Technical Problem

The prior art has a problem that the processing speed is low and a large amount of memory is required in the cryptographic block identifying stage. For example, according to the method of Non-Patent Literature 2, when trying to detect a loop, it is necessary to record all the possibilities that can form a loop, and the possibilities need be tested one by one. A large quantity of calculation is thus required and the processing speed becomes low. Consequently, a large memory capacity is required.

The present invention has been made to solve the above problem, and has as its object to realize speed-up of processing and reduction of memory usage by identifying a cryptographic block with a lightweight operation requiring a small calculation amount.

Solution to Problem

In order to solve the problem described above, a cryptographic block identification apparatus according to the present invention includes: a block candidate extraction part to analyze an execution trace in which an execution step of malware is recorded, calculate an evaluation value representing cipher likeliness of the execution step based on whether or not an operation type that characterizes cipher likeliness is included in the execution step, and extract an execution step where the evaluation value exceeds a threshold L, as a block candidate which is a candidate of a cryptographic block; and a cryptographic block identification part to identify a region of the execution trace in which block candidates are consecutive beyond a threshold M, as a cryptographic block.

A cryptographic block identification method according to the present invention is a cryptographic block identification method of a cryptographic block identification apparatus which analyzes an execution trace in which an execution step of malware is recorded, and identifies a cryptographic block, the cryptographic block identification method including: a block candidate extraction step, by a block candidate extraction part, of analyzing the execution trace, calculating an evaluation value representing cipher likeliness of the execution step based on whether or not an operation type that characterizes cipher likeliness is included in the execution step, and extracting an execution step where the evaluation value exceeds a threshold L, as a block candidate which is a candidate of a cryptographic block; and a cryptographic block identification step, by a cryptographic block identification part, of identifying a region of the execution trace in which the block candidates are consecutive beyond a threshold M, as a cryptographic block.

Advantageous Effects of Invention

According to the present invention, since a block candidate extraction process and a cryptographic block identification process are executed by an addition instruction or a subtraction instruction, a cryptographic block can be identified with a lightweight operation requiring a small calculation amount, so that speed-up of the processing and reduction of memory usage can be realized.

BRIEF DESCRIPTION OF DRAWINGS

FIG. 3 is an explanatory diagram illustrating an example of a data format expressing each execution step included in an execution trace 5.

FIG. 4 is a diagram illustrating a specific example of the execution trace 5.

FIG. 5 is an explanatory diagram illustrating an example of a data format expressing a block candidate recorded in a block candidate storage part 3.

FIG. 6 is a diagram illustrating specific examples of the block candidates recorded in the block candidate storage part 3.

FIG. 7 is an explanatory diagram illustrating an example of a data format expressing cryptographic block information 6.

FIG. 10 is a diagram illustrating transition of a queue according to Embodiment 1 and transition of F(t) which is a sum value of the elements of the queue.

FIG. 11 is a diagram illustrating a status obtained by a block candidate extraction process, of the block candidate storage part 3 in an execution example of Embodiment 1.

FIG. 13 is a diagram illustrating transition of a queue according to Embodiment 2 and transition of F(t) which is a sum value of the elements of the queue.

FIG. 14 is a diagram illustrating a status obtained by a block candidate extraction process, of a block candidate storage part 3 in an execution example of Embodiment 2.

FIG. 15 is a diagram illustrating a storage area which stores an addition result of the value F(t) of cipher likeliness in the forward direction and the value F(t) of cipher likeliness in the reverse direction.

DESCRIPTION OF EMBODIMENTS

Embodiment 1.

Figure 1:
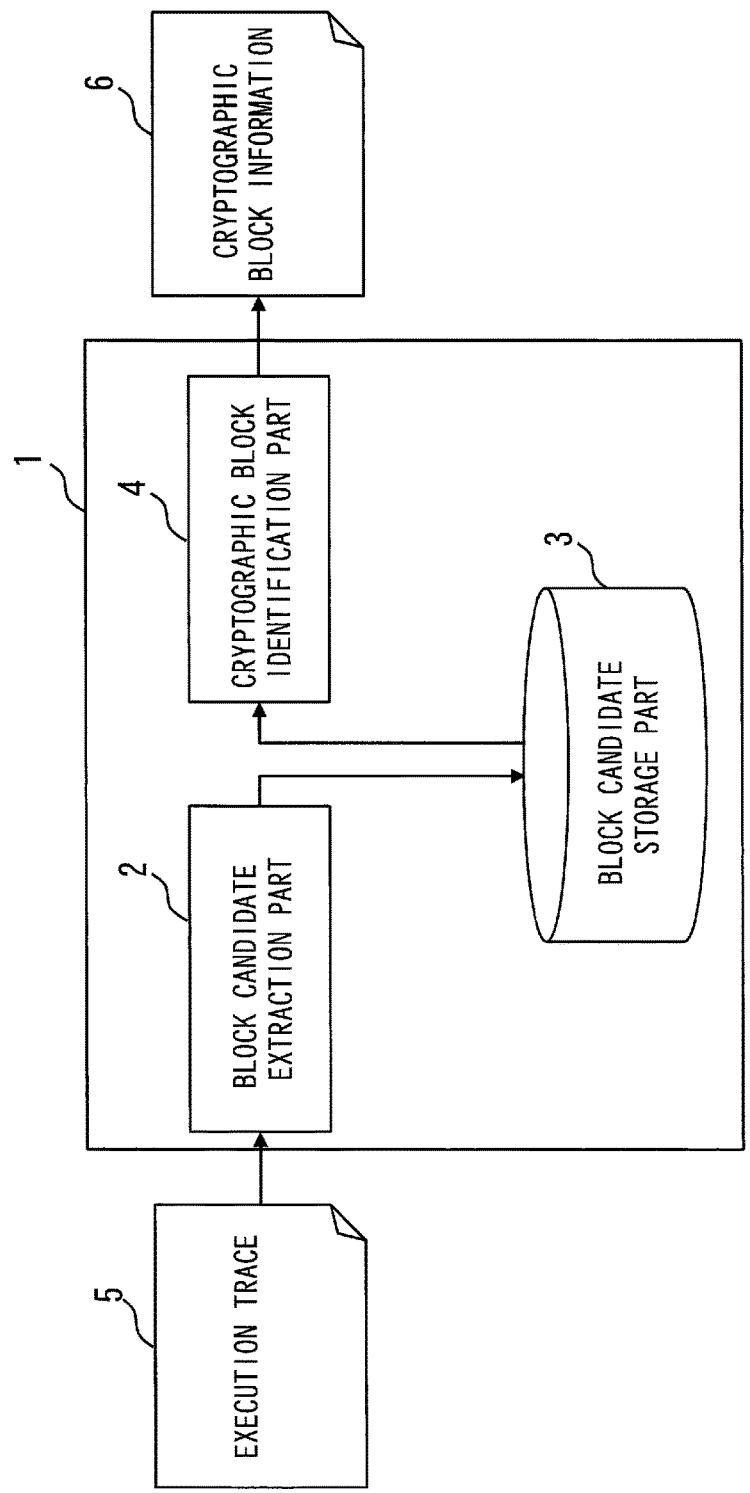
FIG. 1 is a diagram illustrating a configuration example of a cryptographic block identification apparatus according to Embodiment 1.

FIG. 1 is a diagram illustrating a configuration example of a cryptographic block identification apparatus 1 according to Embodiment 1.

Referring to FIG. 1, the cryptographic block identification apparatus 1 is provided with a block candidate extraction part 2, a block candidate storage part 3, and a cryptographic block identification part 4.

The block candidate extraction part 2 analyzes an execution trace 5 being the trace result of instruction execution steps. The block candidate extraction part 2 extracts a block candidate serving as a candidate of an execution step that forms a cryptographic block, based on whether or not there is an instruction such as arithmetic operation, logic operation, bit operation, or the like which characterizes cipher likeliness. The block candidate extraction part 2 outputs the extracted block candidate as related to a block candidate ID which uniquely identifies the extracted block candidate.

The block candidate storage part 3 stores the block candidate extracted by the block candidate extraction part 2.

The cryptographic block identification part 4 identifies the block candidate from among block candidates stored in the block candidate storage part 3 and outputs, as cryptographic block information 6, information of the identified cryptographic block.

The operation of the cryptographic block identification apparatus 1 according to Embodiment 1 will now be described.

Figure 2:
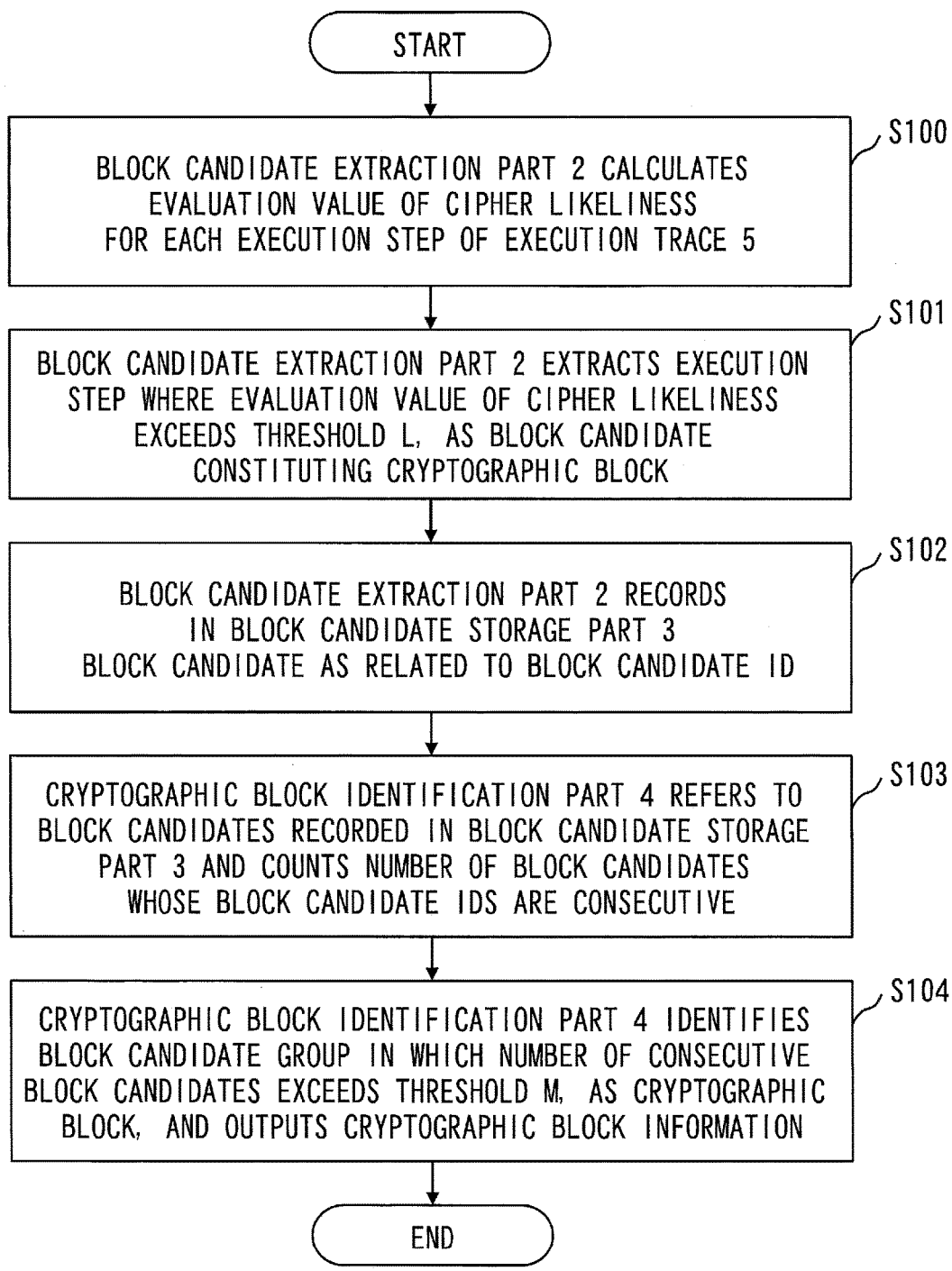
FIG. 2 is a flowchart illustrating an overall operation flow of the cryptographic block identification apparatus 1 according to Embodiment 1.

FIG. 2 is a flowchart illustrating an overall operation flow of the cryptographic block identification apparatus 1 according to Embodiment 1.

First, in step S100, the block candidate extraction part 2 calculates an evaluation value of cipher likeliness for each execution step of the execution trace 5. The block candidate extraction part 2 analyzes information of each execution step included in the inputted execution trace 5. The block candidate extraction part 2 calculates the evaluation value expressing the cipher likeliness with using an evaluation function which evaluates cipher likeliness, based on whether or not there is an instruction such as arithmetic operation, logic operation, bit operation, or the like included in each execution step. Arithmetic operation, logic operation, bit operation, and so on are used as the information indicating the cipher likeliness because cryptographic processing includes many addition processes, many logic operations such as XOR, or many bit operations such as shift processes. The evaluation function which evaluates cipher likeliness and the evaluation value which expresses the cipher likeliness will be described later.

An example of a data format of the execution trace 5 and a specific example of the execution trace 5 will be described.

FIG. 3 is an explanatory diagram illustrating an example of the data format expressing each execution step included in the execution trace 5.

FIG. 4 is a diagram illustrating a specific example of the execution trace 5.

Referring to FIG. 3, each execution step included in the execution trace 5 is expressed by a data format including an instruction address, an instruction (opcode), an instruction target (operand), and memory/register access information. FIG. 4 illustrates a specific example of the actual execution trace 5 expressed by the data format illustrated in FIG. 3. The execution trace 5 is expressed with information such as the instruction address being separated by a symbol "!".

In step S101, the block candidate extraction part 2 extracts an execution step where the evaluation value of cipher likeliness calculated in step S100 exceeds a threshold L, as a block candidate constituting the cryptographic block.

In step S102, the block candidate extraction part 2 records in the block candidate storage part 3, the block candidate extracted in step S101 as related to the block ID.

Figure 5:
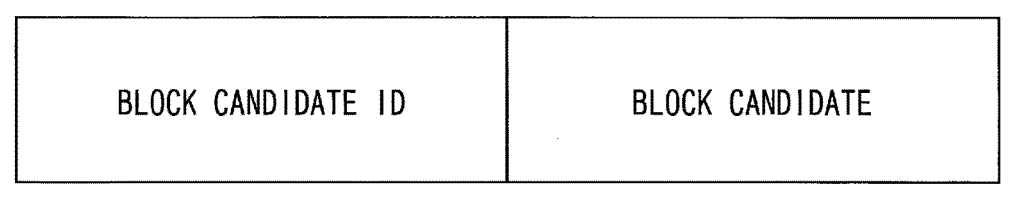

FIG. 5 is an explanatory diagram illustrating an example of a data format expressing the block candidate recorded in the block candidate storage part 3.

FIG. 6 is a diagram illustrating specific examples of the block candidates recorded in the block candidate storage part 3.

Referring to FIG. 5, the block candidate recorded in the block candidate storage part 3 is related to the block candidate ID that uniquely identifies the block candidate. As illustrated in the specific examples of FIG. 6, the block candidate ID and the block candidate are recorded in the block candidate storage part 3 as they are related to each other. The line number of the execution step in the execution trace 5 is used as block candidate ID. The line number of the execution step in the execution trace 5 is also used as the execution step ID of the corresponding execution step.

In step S103, the cryptographic block identification part 4 counts the number of block candidates whose block candidate IDs are consecutive, by referring to the block candidates recorded in the block candidate storage part 3.

In step S104, the cryptographic block identification part 4 identifies a block candidate group in which the number of consecutive block candidates exceeds a threshold M, as the cryptographic block, and outputs the cryptographic block information 6.

FIG. 7 is an explanatory diagram illustrating an example of a data format expressing the cryptographic block information 6.

Referring to FIG. 7, block ID is an identifier that uniquely identifies an identified cryptographic block. Start address indicates the position where the identified cryptographic block starts and employs, for example, the top block candidate ID of the identified cryptographic block. Likewise, end address indicates the position where the identified cryptographic block ends and employs, for example, the last block candidate ID of the identified cryptographic block. An instruction string constituting the block candidate is a string of the block candidate included in the identified cryptographic block and block candidate ID. Block size indicates the number of strings each including the block candidate included in the identified cryptographic block and block candidate ID.

The overall operation flow of the cryptographic block identification apparatus 1 has been described so far.

The operation of the block candidate extraction part 2 will now be described in detail with reference to FIG. 8. A case will be described where the execution trace 5 is inputted to the block candidate extraction part 2 in the forward direction.

An example of the evaluation function that evaluates the cipher likeliness used by the block candidate extraction part 2 will be described.

The evaluation function used in this embodiment is defined by, for example, following formula 1.

$$F(t) = \sum_{i=0}^{N} f_i(t)$$ [Formula 1]

$$f_i(t) = \begin{cases} 0 & (g_i(t) < 0) \\ g_i(t) & (g_i(t) \geq 0) \end{cases}$$

$$g_i(t) = \begin{cases} 0 & (t < \tau_i) \\ \alpha - \delta(t - \tau_i) & (t \geq \tau_i) \end{cases}$$

Note that F(t) is an evaluation value indicating the cipher likeliness in t, and that $f_i(t)$ and $g_i(t)$ are attenuation functions each excited in the i-th turn.

Note that t denotes elapsed time, and indicates in what place an execution step is located in the execution trace 5.

Note that N denotes the number of attenuation functions $f_i(t)$ excited in the execution trace 5 being a measurement target, and indicates the number of arithmetic operations, logic operations, and bit operations included in the execution trace 5.

Note that $\tau_i$ denotes a time point when the attenuation function $f_i(t)$ is to be excited in the i-th turn, and indicates in what place the execution step is located in the execution trace 5 at the excitation timing.

Note that α is a value defined to express the cipher likeliness.

Note that δ(t) is a value for attenuating the evaluation value expressing the cipher likeliness at the time point when the attenuation function $f_i(t)$ is excited, and expresses the attenuation amount of cipher likeliness per instruction.

In above formula 1, the attenuation function $f_i(t)$ is excited at a timing when arithmetic operation, logic operation, or bit operation is processed. The attenuation function $f_i(t)$ takes only a positive value. If the attenuation function $g_i(t)$ takes a negative value, the value of attenuation function $f_i(t)$ is 0.

The operation flow of the block candidate extraction part 2 will be described with referring to a flowchart.

Figure 8:
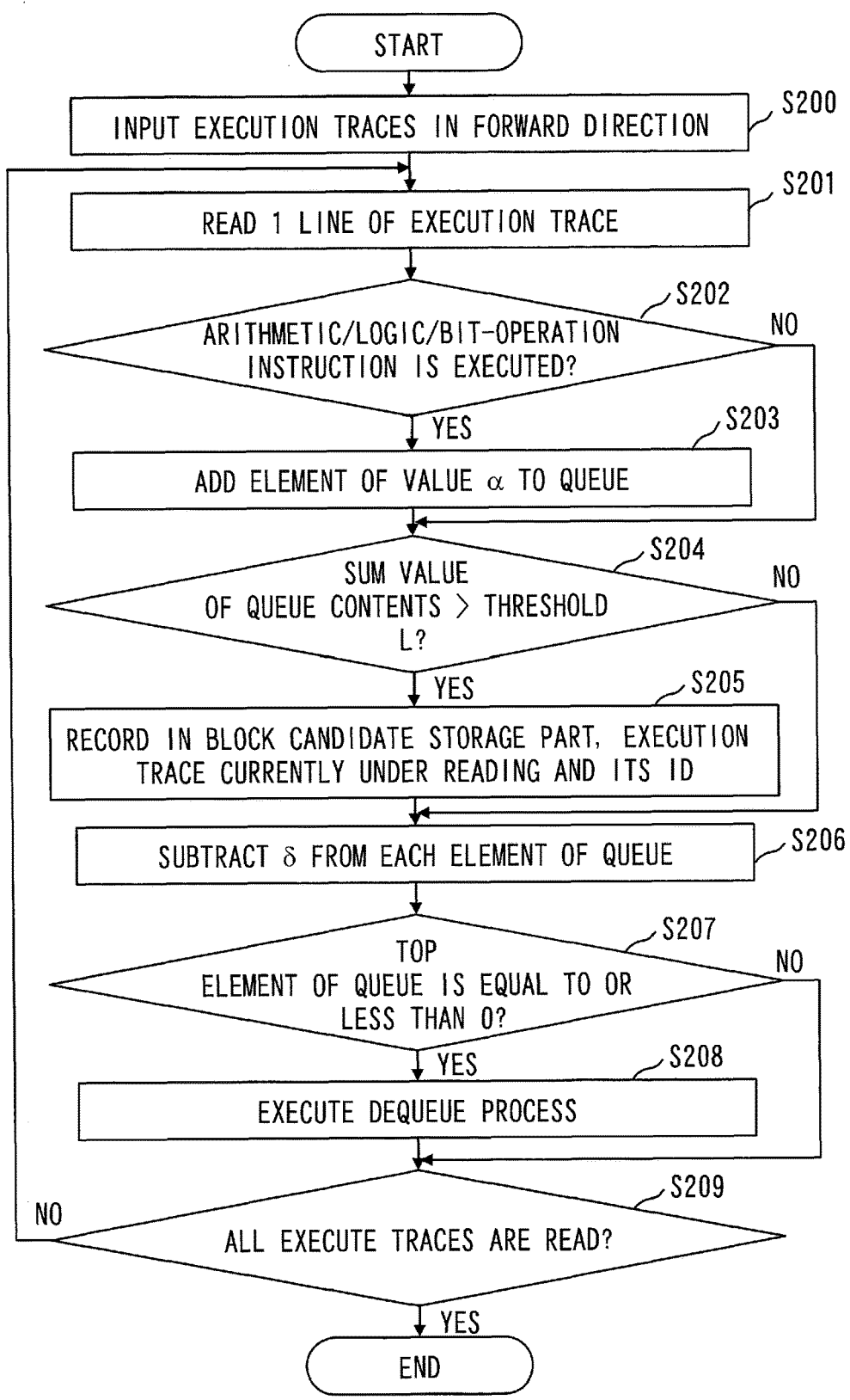
FIG. 8 is a flowchart illustrating an operation flow of a block candidate extraction part 2.

FIG. 8 is a flowchart illustrating an operation flow of the block candidate extraction part 2.

First, in step S200, the execution trace 5 is inputted to the block candidate extraction part 2 in the forward direction. A queue for recording an evaluation value indicating the cipher likeliness as an element is prepared. In the initial status, the queue is empty.

In step S201, the block candidate extraction part 2 reads 1 line of the inputted execution trace 5.

In step S202, the block candidate extraction part 2 checks the instruction portion of the 1-line execution trace read in step S201. If the instruction is an arithmetic/logic/bit operation, the block candidate extraction part 2 moves to step S203 via a Yes branch; otherwise, to step S204 via a No branch.

In step S203, the block candidate extraction part 2 adds a value α defined as the cipher likeliness to the queue. Note that α corresponds to α defined in formula 1.

In step S204, the block candidate extraction part 2 calculates a value F(t) as the sum value of all the contents of the queue including α added in step S203. If F(t) exceeds L being a threshold regarded as a cryptographic block candidate, the block candidate extraction part 2 moves to step S205 via a Yes branch; otherwise, to step S206 via a No branch. Note that F(t) corresponds to F(t) defined in formula 1.

In step S205, the block candidate extraction part 2 records in the block candidate storage part 3 the execution trace 5 currently under reading, and the ID of the execution trace 5, as a block candidate and a block candidate ID, respectively. The information to be recorded in the block candidate storage part 3 includes, in addition to the execution trace 5 and its ID, information intended to be outputted by the cryptographic block identification part 4 as a cryptographic block. It may also be possible to record all information included in the execution trace 5 as they are.

In step S206, the block candidate extraction part 2 performs a subtraction process of subtracting δ from each of all elements included in the queue. Note that δ corresponds to $δ(t−τ_i)$ defined in formula 1.

In step S207, the block candidate extraction part 2 determines whether or not the top element of the queue is equal to or less than 0. If the top element of the queue is equal to or less than 0, the block candidate extraction part 2 moves to step S208 via a Yes branch; otherwise, to step S209 via a No branch.

In step S208, the block candidate extraction part 2 executes a dequeue process. The dequeue process is a process of deleting the top element of the queue and shifting the remaining elements forward.

In step S209, the block candidate extraction part 2 judges whether or not all execute traces are read. The block candidate extraction part 2 checks whether or not the execution trace 5 currently under reading is the last line of the execution trace 5 inputted in step S200. If the execution trace 5 currently under reading is the last line, the block candidate extraction part 2 moves to a Yes branch and ends the process of block candidate extraction. If the execution trace 5 currently under reading is not the last line, the block candidate extraction part 2 returns to step S201 via a No branch.

The operation flow of the block candidate extraction part 2 has been described so far.

In the above description, a queue is used as a data structure that stores the value of cipher likeliness. An array, a stack, a table, or the like may be used as far as it is a structure that can store data. If a queue is used, the number of elements of the queue can be maintained to be small because of the dequeue process of step S204. Therefore, an effect of reducing the subtraction process of step S206 and suppressing memory consumption can be expected.

The operation flow of the cryptographic block identification part 4 will be described with referring to a flowchart.

Figure 9:
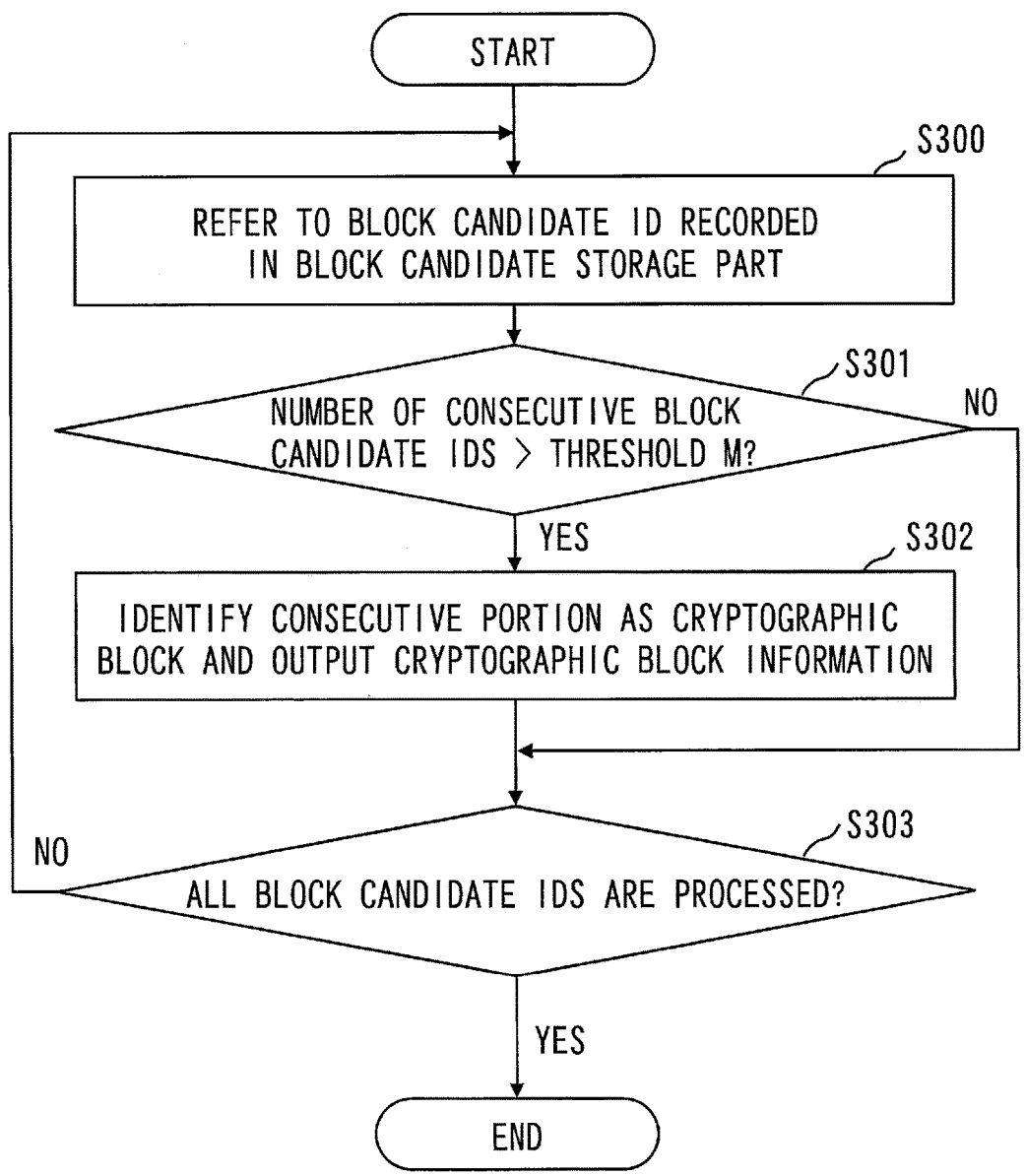
FIG. 9 is a flowchart illustrating an operation flow of a cryptographic block identification part 4.

FIG. 9 is a flowchart illustrating an operation flow of the cryptographic block identification part 4.

First, in step S300, the cryptographic block identification part 4 refers to the block candidate ID recorded in the block candidate storage part 3.

In step S301, the cryptographic block identification part 4 counts the number of consecutive block candidate IDs referred to and determines whether the number of consecutive block candidate IDs exceeds the threshold M. If the number of consecutive block candidate IDs exceeds the threshold M, the cryptographic block identification part 4 moves to step S302 via a Yes branch; otherwise, to step S303 via a No branch.

In step S302, the cryptographic block identification part 4 identifies a portion where the block candidate IDs are consecutive, as a cryptographic block, and outputs the cryptographic block information 6 including information of the block candidates and block candidate IDs. For example, the cryptographic block information 6 has the data format described with reference to FIG. 7.

In step S303, the cryptographic block identification part 4 determines whether or not all the block candidate IDs stored in the block candidate storage part 3 are processed. If all the block candidate IDs are processed, the cryptographic block identification part 4 moves to a Yes branch and ends the process of cryptographic block identification. If not all the block candidate IDs are processed, the cryptographic block identification part 4 returns to step S300 via a No branch.

The operation flow of the cryptographic block identification part 4 has been described so far.

Specific execution examples of the block candidate extraction process and cryptographic block identification process mentioned above will be described. Note that these execution examples are merely examples for aiding understanding of the present invention and are not intended to limit the present invention.

The specific execution example of the block candidate extraction process will be described first.

FIG. 10 is a diagram illustrating transition of the queue according to Embodiment 1 and transition of F(t) which is a sum value of the elements of the queue.

FIG. 10 illustrates a case where the execution trace 5 consisting of 31 execution steps is inputted to the block candidate extraction part 2 from the top to the bottom in the forward direction. This execution trace 5 has an execution step that includes an instruction of arithmetic operation, logic operation, or bit operation. This execution step is indicated by a circle in the column of "instruction exists" of FIG. 10.

In step S207, if the threshold L regarded as the cryptographic block candidate is set to 8, an execution step in which F(t) exceeds 8 is recorded in the block candidate storage part 3 as a block candidate. In FIG. 10, the value of F(t) of the block candidate recorded in the block candidate storage part 3 is in italics.

The specific execution example of the cryptographic block identification process will now be described.

FIG. 11 is a diagram illustrating a status obtained by a block candidate extraction process, of the block candidate storage part 3 in the execution example of Embodiment 1.

In step S301, assume that the threshold M of the number of consecutive block candidate IDs is set to 5. With block candidates having block candidate IDs of 4 to 9, the number of consecutive block candidate IDs is 6. Thus, the block candidates having block candidate IDs of 4 to 9 are identified to constitute a cryptographic block, and cryptographic block information 6 is outputted. Block candidates having block candidate IDs of 13 and 15 are not consecutive and accordingly not regarded to constitute a cryptographic block. Thus, no cryptographic block information 6 is outputted.

In this manner, by conducting the block candidate extraction process and the cryptographic block identification process, it is possible to measure the distribution of the arithmetic operation, logic operation, and bit operation which represent the cipher likeliness. As a result, a portion where arithmetic operation, logic operation, and bit operation line up consecutively can be detected.

As described above, with the invention of Embodiment 1, since the block candidate extraction process and the cryptographic block identification process are executed by an addition instruction or a subtraction instruction, the cryptographic block can be identified with a lightweight operation requiring a small calculation amount, providing an effect that speed-up of processing and reduction of memory usage can be realized.

In some execution trace 5, a portion including an encryption logic includes a process other than arithmetic operation, logic operation, and bit operation, as part of its process. When a portion expected to be detected as a cryptographic block includes a non-consecutive portion in this manner where arithmetic operation, logic operation, and bit operation do not line up consecutively, the expectedly cryptographic-block portion can be identified as a cryptographic block as far as the non-consecutive portion is close to a consecutive portion. Hence, by ignoring some noise like an instruction other than arithmetic operation, logic operation, and bit operation, the non-consecutive portion can be detected as a portion where arithmetic operation, logic operation, and bit operation line up consecutively.

There is also a case where a few instructions of arithmetic operation, logic operation, or bit operation are executed in a portion not including an encryption logic. In this case, the cryptographic block identification part 4 can remove arithmetic operation, logic operation, and bit operation that are executed only as few instructions, as not being a cryptographic block.

Embodiment 2.

In Embodiment 1, the execution trace 5 is analyzed in the forward direction so that the cryptographic block can be identified with a lightweight operation requiring a small calculation amount. In Embodiment 2, a case will be described where the cryptographic block is identified with high precision by additionally employing a result obtained by analyzing an execution trace 5 in the reverse direction.

The configuration of Embodiment 2 is similar to the configuration of Embodiment 1 illustrated in FIG. 1.

An operation of a cryptographic block identification apparatus 1 according to Embodiment 2 will now be described.

Figure 12:
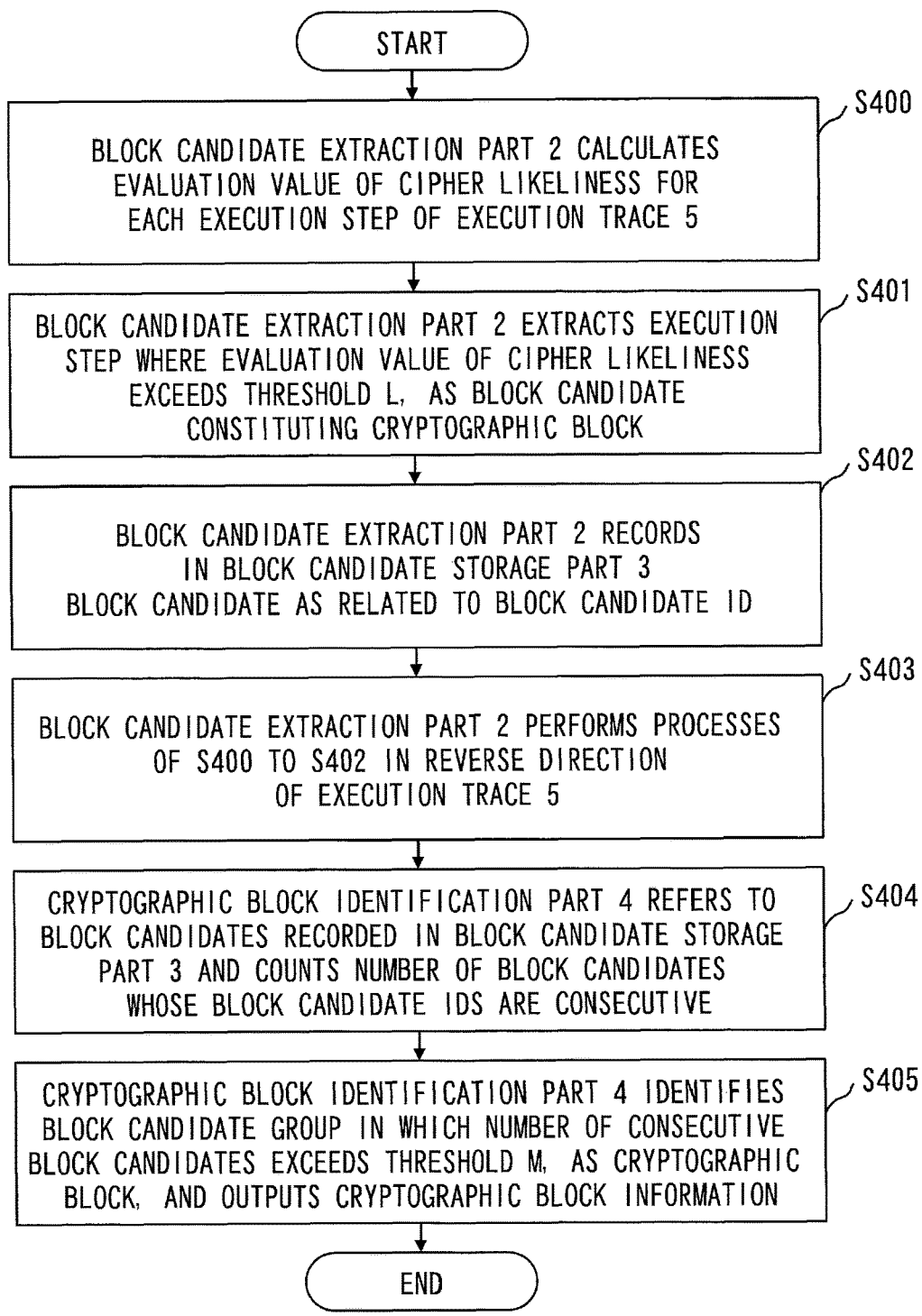
FIG. 12 is a flowchart illustrating an overall operation flow of a cryptographic block identification apparatus 1 according to Embodiment 2.

FIG. 12 is a flowchart illustrating an overall operation flow of the cryptographic block identification apparatus 1 according to Embodiment 2.

In FIG. 12, step S400 to step S402 are similar to step S100 to step S102 of Embodiment 1 and their description will accordingly be omitted.

In step S403, a block candidate extraction part 2 performs processes of step S400 to step S402 in the reverse direction of the execution trace 5. As a result, block candidates selected from the execution trace 5 in both of the forward direction and the reverse direction, and the IDs of the selected block candidates are recorded in a block candidate storage part 3.

FIG. 13 is a diagram illustrating transition of a queue according to Embodiment 2 and transition of F(t) which is a sum value of the elements of the queue.

FIG. 13 illustrates a case where the execution trace 5 consisting of 31 execution steps is inputted to the block candidate extraction part 2 from the bottom to the top in the reverse direction. As is the case of FIG. 10, this execution trace 5 has an execution step that includes an instruction of arithmetic operation, logic operation, or bit operation. This execution step is indicated by a circle in the column of "instruction exists" of FIG. 13.

In step S403, if a threshold L regarded as the cryptographic block candidate is set to 8, an execution step in which F(t) exceeds 8 is recorded in the block candidate storage part 3 as a block candidate. In FIG. 13, the value of F(t) of the block candidate recorded in the block candidate storage part 3 is in italics. When recording the block candidates in the block candidate storage part 3, a block candidate that is already registered in the forward-direction analysis of the execution trace 5 need not be registered. In this execution example, such a block candidate will not be registered.

FIG. 14 is a diagram illustrating a status obtained by a block candidate extraction process, of a block candidate storage part 3 in the execution example of Embodiment 2.

FIG. 14 illustrates the status in which block candidates extracted by analyzing the execution trace 5 in both of the forward direction and the reverse direction are recorded in the block candidate storage part 3.

In step S301, assume that a threshold M of the number of consecutive block candidate IDs is set to 5. With block candidates having block candidate IDs of 1 to 9, the number of consecutive block candidate IDs is 9. Thus, the block candidates having block candidate IDs of 1 to 9 are identified to constitute a cryptographic block, and cryptographic block information 6 is outputted. Although block candidate IDs of 12 and 13 are consecutive, since the number of consecutive block candidate IDs is 2, the corresponding block candidates are not regarded to constitute a cryptographic block. Thus, no cryptographic block information 6 is outputted.

As described above, in the invention of Embodiment 2, an evaluation function which evaluates cipher likeliness is employed. Thus, in addition to the effect described in Embodiment 1, an effect of identifying the start point and the end point of the cryptographic block accurately can be obtained. In the evaluation function for evaluating the cipher likeliness, each time arithmetic operation, logic operation, or logic operation is discovered, a value $\alpha$ defined as the cipher likeliness is added to the elements of the queue, and the value of each element added to the queue decrements by $\delta$ in each step. The value F(t) as the sum of all values of the elements of the queue is used as the index of the cipher likeliness. Hence, once arithmetic operation, logic operation, and bit operation line up consecutively, the value F(t) indicating the cipher likeliness decreases sharply. This makes it possible to identify the end point of the cryptographic block accurately. By performing the processes in both of the forward direction and the reverse direction, an effect of identifying the start point and the end point of the cryptographic block with high precision can be obtained.

Embodiment 3.

In above Embodiment 2, the block candidate IDs are recorded in the block candidate storage part 3 in both of the forward direction and the reverse direction. In Embodiment 3, a case will be described where a value F(t) of cipher likeliness in the forward direction and a value F(t) of cipher likeliness in reverse direction are calculated first, and block candidate IDs are recorded in a block candidate storage part 3 by a single recording operation.

Embodiment 3 has a configuration where a block candidate extraction part 2 is provided with a storage area to store for each block candidate ID the addition result of a value F(t)

of cipher likeliness in the forward direction and a value F(t) of cipher likeliness in the reverse direction. Except for this, the configuration of Embodiment 3 is similar to that of Embodiment 2.

FIG. 15 is a diagram illustrating the storage area to store the addition result of the value F(t) of cipher likeliness in the forward direction and the value F(t) of cipher likeliness in the reverse direction.

In FIG. 15, the addition result of the value F(t) of cipher likeliness in the forward direction and the value F(t) of cipher likeliness in the reverse direction is stored in the storage area of "F(t) addition result".

The operation of a cryptographic block identification apparatus 1 according to Embodiment 3 will now be described.

First, the block candidate extraction part 2 executes step S201 to step S206 of Embodiment 1 in the forward direction and stores a forward-direction evaluation value being a sum value of all contents of the queue, for each block candidate ID in the storage area of "F(t) addition result".

Then, the block candidate extraction part 2 executes step S201 to step S206 of Embodiment 1 in the reverse direction and adds a reverse-direction evaluation value being a sum value of all contents of the queue, to the forward-direction evaluation value stored in the storage area of "F(t) addition result" of the corresponding block candidate ID.

If the value of "F(t) addition result" exceeds a threshold L regarded as a cryptographic block candidate, the block candidate extraction part 2 records the corresponding block candidate ID and block candidate to the block candidate storage part 3.

As described above, in the invention of Embodiment 3, since the block candidate ID is recorded in the block candidate storage part 3 based on the addition result of the forward-direction value and reverse-direction value, the block candidate ID can be recorded in the block candidate storage part 3 by a single recording operation. Thus, in addition to the effect described in Embodiment 1, an effect of reducing the processing amount of the block candidate extraction process can be obtained.

Embodiment 4.

In Embodiments 1 to 3 described above, a process of identifying a cryptographic block by analyzing the execution trace 5 is described. In Embodiment 4, a case will be described where the evaluation value representing cipher likeliness is visualized by means of a graph, so that the distribution of the arithmetic operation, logic operation, and bit operation can be visually checked with ease.

Figure 16:
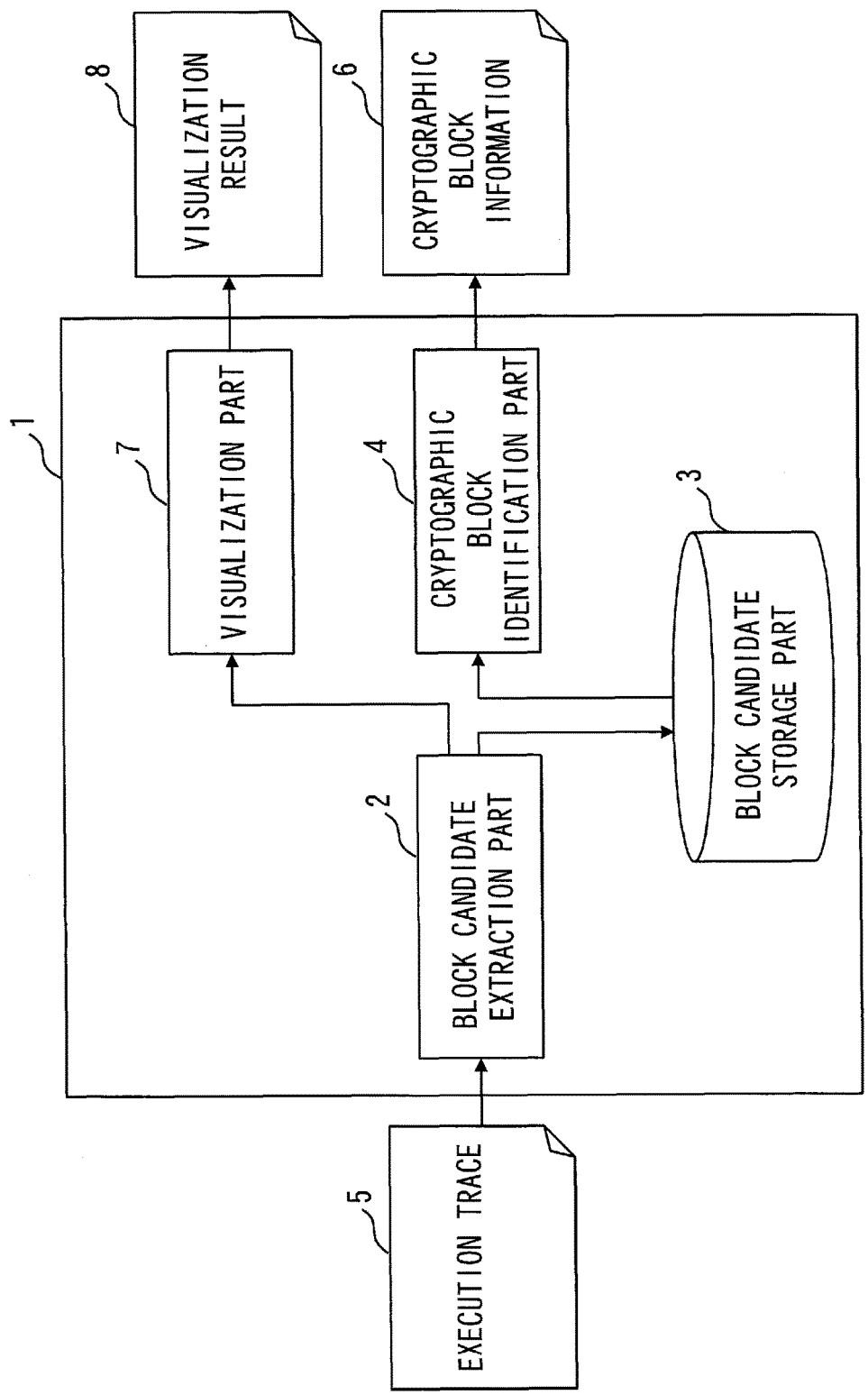
FIG. 16 is a diagram illustrating a configuration example of a cryptographic block identification apparatus 1 according to Embodiment 4.

FIG. 16 is a diagram illustrating a configuration example of a cryptographic block identification apparatus 1 according to Embodiment 4.

Referring to FIG. 16, the cryptographic block identification apparatus 1 is provided with a visualization part 7 which visualizes an evaluation value representing cipher likeliness and outputs a visualization result 8. Except for this, the configuration of Embodiment 4 is similar to the configurations of Embodiments 1 to 3.

The operation of the cryptographic block identification apparatus 1 according to Embodiment 4 will be described hereinafter.

First, a block candidate extraction part 2 records an evaluation value F(t) representing cipher likeness for each execution step line of an execution trace 5 in accordance with the processing procedure indicated in Embodiments 1 to 3. In this state, each execution step of the execution trace 5 and an evaluation value F(t) representing cipher likeliness are recorded as they are related to each other.

Then, the visualization part 7 visualizes the evaluation value F(t) recorded in the block candidate extraction part 2 and representing cipher likeliness, by means of, for example, a graph, to indicate the visualization result 8 to the user.

Figure 17:
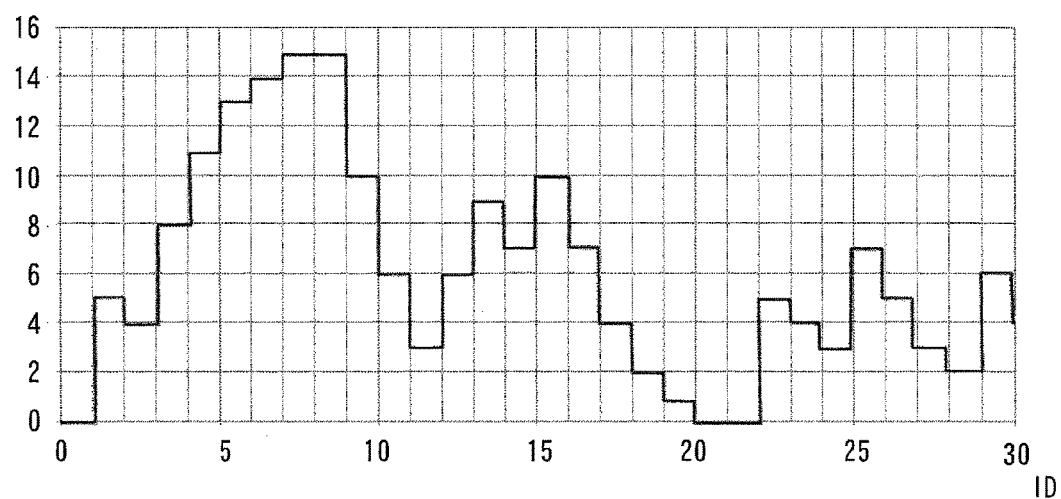
FIG. 17 is a diagram illustrating a distribution of an evaluation value representing cipher likeliness in the forward direction.
Figure 18:
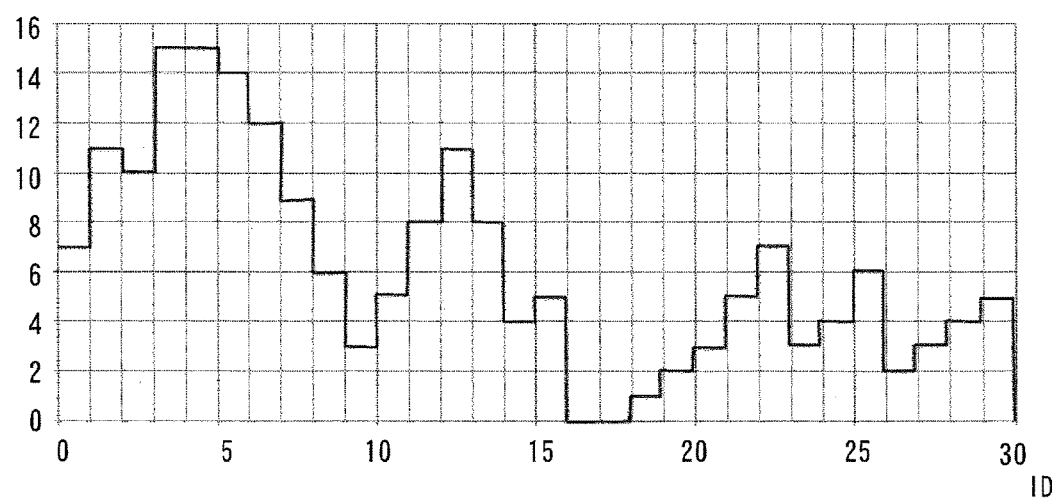
FIG. 18 is a diagram illustrating a distribution of an evaluation value representing cipher likeliness in the reverse direction.
Figure 19:
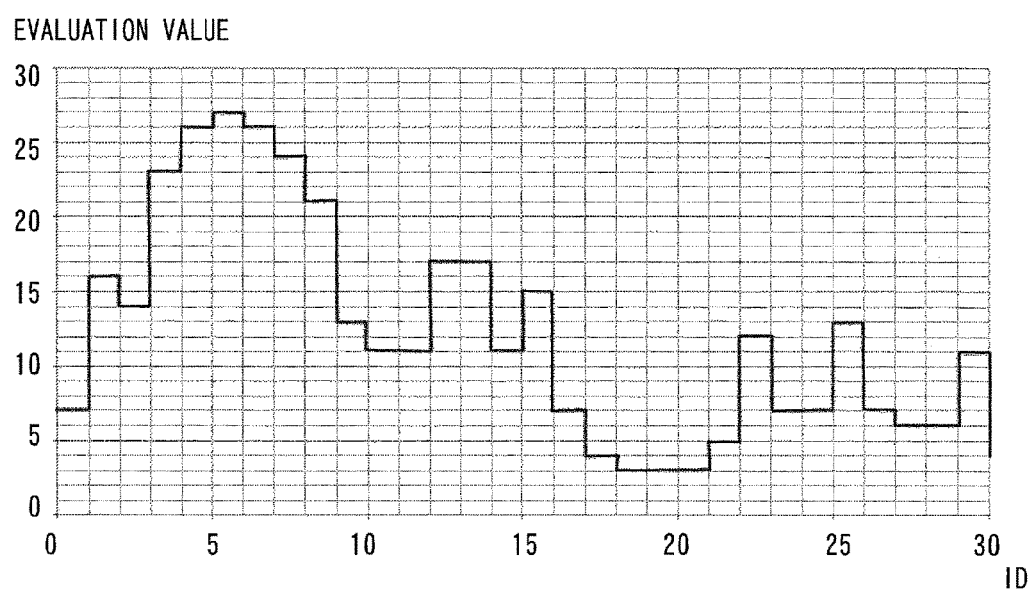
FIG. 19 is a diagram illustrating a distribution of an addition result of the evaluation values representing the cipher likeliness in the forward direction and reverse direction.

FIGS. 17 to 19 are diagrams each illustrating an example of visualizing an evaluation value representing cipher likeliness.

FIG. 17 is a diagram illustrating a distribution of an evaluation value representing cipher likeliness in the forward direction.

FIG. 18 is a diagram illustrating a distribution of an evaluation value representing cipher likeliness in the reverse direction.

FIG. 19 is a diagram illustrating a distribution of an addition result of the evaluation values representing the cipher likeliness in the forward direction and reverse direction.

In FIGS. 17 to 19, "ID" taken along the axis of abscissa indicates an execution step ID in the execution trace 5, and "evaluation value" taken along the axis of ordinate indicates an evaluation value representing cipher likeliness.

As described above, in the invention of Embodiment 4, the distribution of the evaluation value representing cipher likeliness is visualized. Therefore, in addition to the effect described in Embodiment 1, an effect is obtained that a portion that is uncertain as a cryptographic block can be visually judged easily.

Embodiment 5.

In Embodiments 1 to 4 described above, a cryptographic block is identified with a small processing amount by a criterion that which region of the execution trace 5 includes a large amount of arithmetic operation, logic operation, and bit operation. In Embodiment 5, a case will be described where the fact that the cryptographic block identification apparatus 1 according to Embodiments 1 to 4 has a light-weight processing amount is used, and a block candidate extraction part 2 of a cryptographic block identification apparatus 1 is employed as a filter of an execution trace to be inputted to another cryptographic block identification apparatus.

Figure 20:
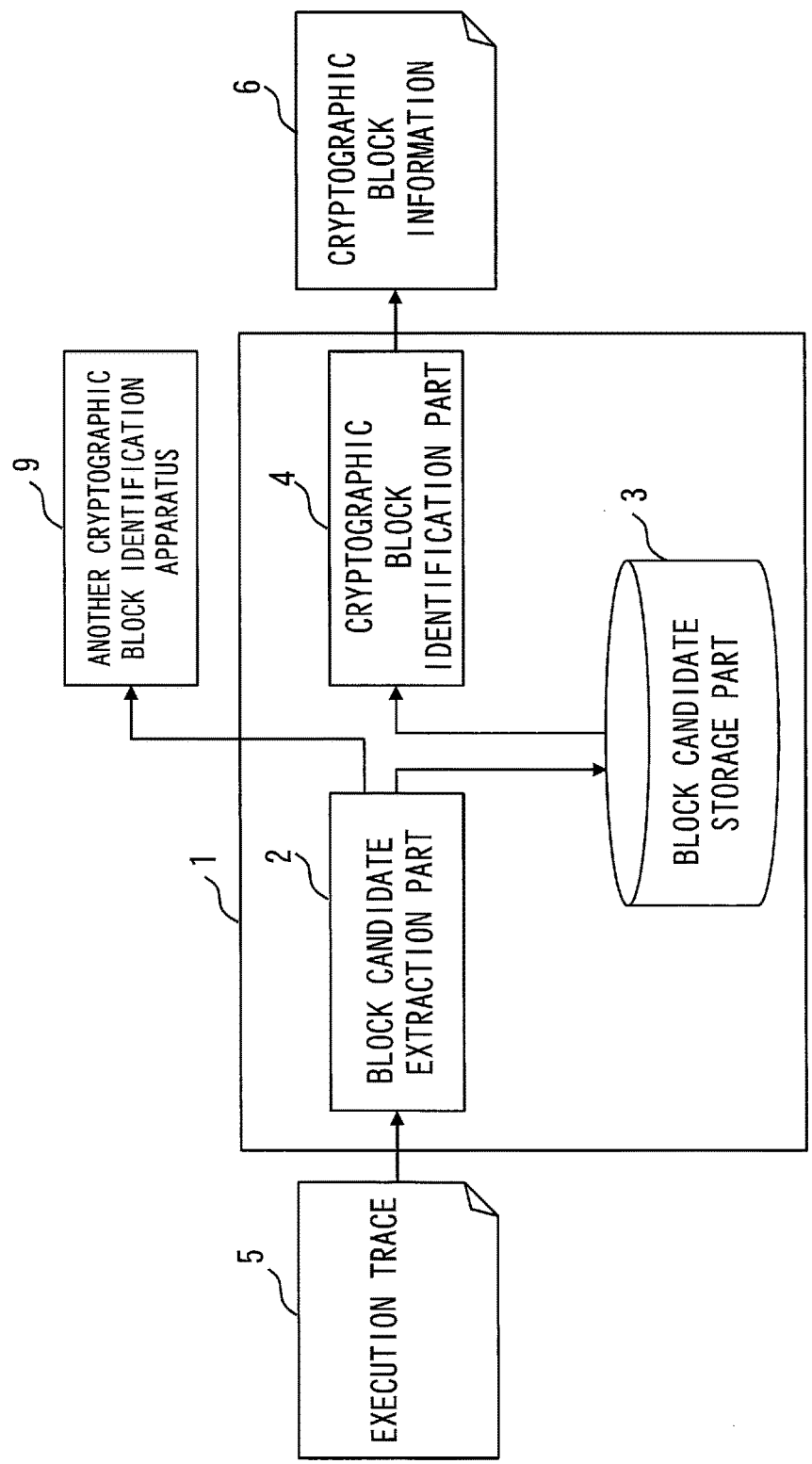
FIG. 20 is a diagram illustrating a configuration example of a cryptographic block identification apparatus 1 according to Embodiment 5.

FIG. 20 is a diagram illustrating a configuration example of the cryptographic block identification apparatus 1 according to Embodiment 5.

In FIG. 20, the cryptographic block identification apparatus 1 is provided with another cryptographic block identification apparatus 9 which performs a cryptographic block identification process that is different from that of the present invention. Except for this, the configuration of Embodiment 5 is similar to the configurations of Embodiments 1 to 3.

The operation of the cryptographic block identification apparatus 1 according to Embodiment 5 will now be described.

First, the block candidate extraction part 2 analyzes an inputted execution trace 5 in accordance with processing procedures indicated in Embodiments 1 to 3 to calculate an evaluation value F(t) representing cipher likeliness for each execution line of the execution trace 5. In this case, the direction of analyzing the execution trace 5 may be either one of the forward direction and the reverse direction, or may be both of the two directions.

Then, the block candidate extraction part 2 extracts, by filtering, only execution steps having an evaluation value F(t) equal to or larger than a preset threshold from among execution steps included in the execution trace 5 imparted with the calculated evaluation value F(t) representing cipher likeliness. The block candidate extraction part 2 outputs an execution trace including only the extracted execution steps to another cryptographic block identification apparatus 9.

Subsequently, this another cryptographic block identification apparatus 9 executes a cryptographic block identification process on the execution trace filtered by the block candidate extraction part 2.

As described above, in the invention of Embodiment 5, the execution trace filtered by the block candidate extraction part 2 is inputted to another cryptographic block identification apparatus 9. Thus, when another cryptographic block identification apparatus 9 requires an enormously long processing time and memory because a large amount of execution traces must be processed, an effect is obtained that an increase in processing speed and reduction of the memory use of this another cryptographic block identification apparatus 9 can be realized.

Embodiment 6.

In Embodiments 1 to 5 described above, the process up to analyzing the execution trace 5 and identifying a cryptographic block is described. In Embodiment 6, a following case will be described. An execution trace is extracted from an execution file of analysis-target malware. A cryptographic block identification apparatus 1 identifies a cryptographic block from the execution trace, then analyzes an inputted communication log using an encryption logic used by the cryptographic block, and outputs a key and a plaintext as an analysis result.

Figure 21:
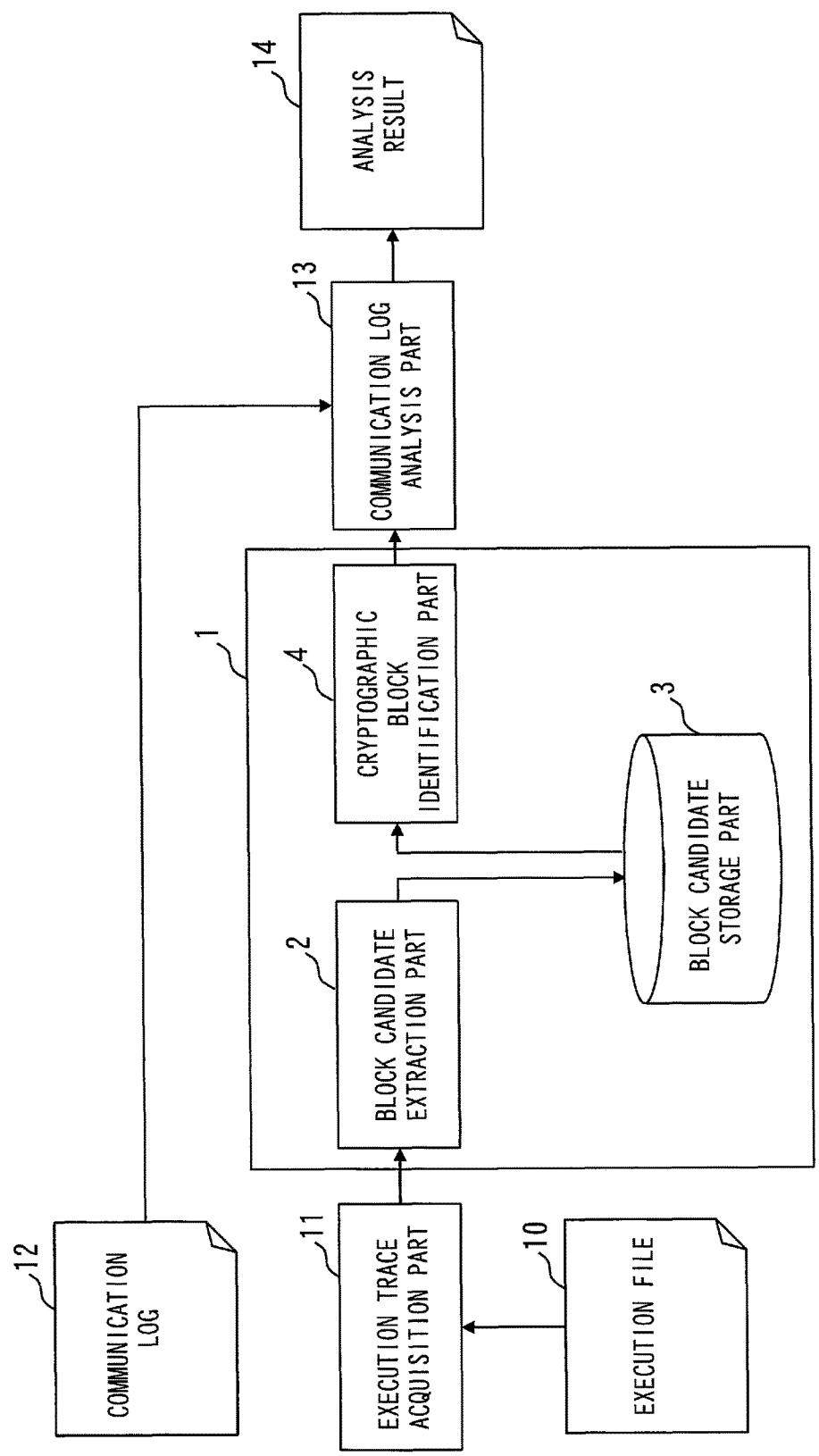
FIG. 21 is a diagram illustrating a configuration example of a cryptographic block identification apparatus 1 according to Embodiment 6.

FIG. 21 is a diagram illustrating a configuration example of the cryptographic block identification apparatus 1 according to Embodiment 6.

Referring to FIG. 21, the cryptographic block identification apparatus 1 is provided with an execution trace acquisition part 11 which acquires an execution trace by executing an execution file 10 of malware, and a communication log analysis part 13 which analyzes a communication log 12 with using cryptographic block information outputted from a cryptographic block identification part 4 and outputs an analysis result 14 including a key and a plaintext. Except for this, the configuration of Embodiment 6 is similar to the configurations of Embodiments 1 to 3.

The operation of the cryptographic block identification apparatus 1 according to Embodiment 6 will now be described.

First, the execution file 10 as an analysis target is inputted to the execution trace acquisition part 11. The execution trace acquisition part 11 acquires an execution trace by executing the execution file 10 and inputs the acquired execution trace to the cryptographic block identification apparatus 1.

Then, the cryptographic block identification apparatus 1 identifies a cryptographic block in the execution trace in accordance with the processing procedures indicated in Embodiments 1 to 3, and outputs cryptographic block information of the identified cryptographic block.

Then, using the cryptographic block information outputted from the cryptographic block identification part 4, the communication log analysis part 13 inputs a communication log 12 including an encrypted message being the analysis target, and a key identified by the cryptographic block information, to a cryptographic block identified by the cryptographic block information. The communication log analysis part 13 identifies a plaintext and outputs the analysis result 14 including the identified key and plaintext. The communication log analysis part 13 may use the method disclosed in Patent Literature 1.

As described above, in the invention of Embodiment 6, the encryption logic can be identified from the execution file of the malware automatically and at a high speed, and the key and the plaintext can be obtained. As a result, a decoding process that has conventionally been done manually by a person with an advanced technique can be performed automatically. This provides an effect that costs such as personnel expenses necessary for decoding the communication log can be reduced.

A hardware configuration of the cryptographic block identification apparatuses 1 indicated in Embodiments 1 to 6 will be described.

Figure 22:
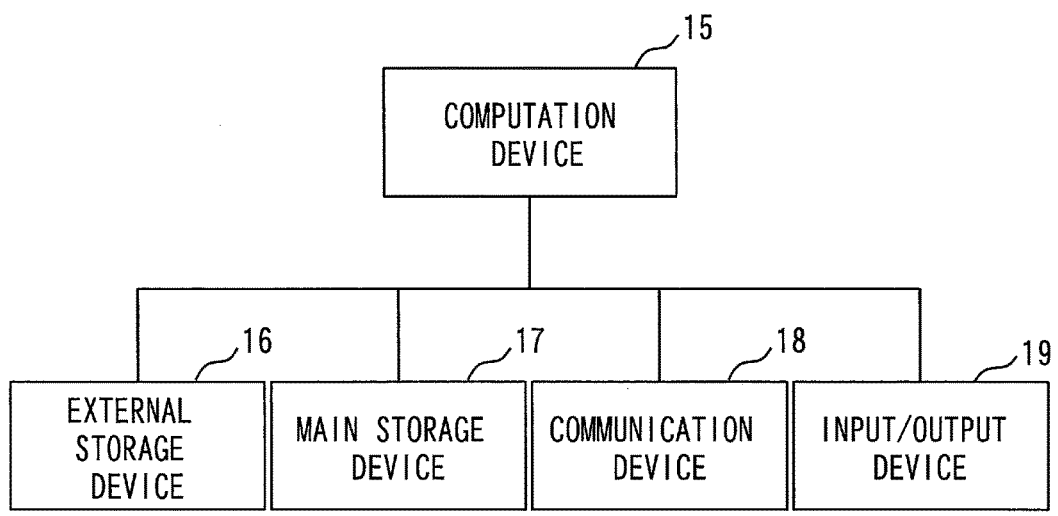
FIG. 22 is a diagram illustrating a hardware configuration example of the cryptographic block identification apparatuses 1 indicated in Embodiments 1 to 6.

FIG. 22 is a diagram illustrating a hardware configuration example of the cryptographic block identification apparatuses 1 according to Embodiments 1 to 6.

The cryptographic block identification apparatus 1 is a computer. The elements of the cryptographic block identification apparatus 1 can be implemented by a program. According to the hardware configuration of the cryptographic block identification apparatus 1, a computation device 15, an external storage device 16, a main storage device 17, a communication device 18, and an input/output device 19 are connected to a bus.

The computation device 15 is a CPU (Central Processing Unit) or the like which executes the program. The external storage device 16 is, for example, a ROM (Read Only Memory), a flush memory, a hard disk device, or the like. The main storage device 17 is, for example, a RAM (Random Access Memory) or the like. The communication device 18 is, for example, a communication board, or the like. The input/output device 19 is, for example, a mouse, a keyboard, a display device, or the like.

The program is ordinarily stored in the external storage device 16. The program is loaded to the main storage device 17 and is sequentially read and executed by the computation device 15. This program is a program that implements functions described as the block candidate extraction part 2, the cryptographic block identification part 4, the visualization part 7, the execution trace acquisition part 11, and the communication log analysis part 13 which make up the cryptographic block identification apparatus 1.

Furthermore, the external storage device 16 also stores an operating system (OS). The OS is loaded to the main storage device 17 at least partly. The computation device 15 executes the program while executing the OS.

In the description of Embodiments 1 to 6, information and data which are stored in the block candidate storage part 3, and information, data, a signal value, and a variable value which indicate the results of processes of the block candidate extraction part 2, the cryptographic block identification part 4, the visualization part 7, the execution trace acquisition part 11, and the communication log analysis part 13 are stored in the main storage device 17 in the form of files.

The configuration of FIG. 22 merely illustrates an example of the hardware configuration of each apparatus. The hardware configuration of each apparatus is not limited to the configuration illustrated in FIG. 22, and each apparatus may have another configuration.

REFERENCE SIGNS LIST

1: cryptographic block identification apparatus; 2: block candidate extraction part; 3: block candidate storage part; 4: cryptographic block identification part; 5: execution trace; 6: cryptographic block information; 7: visualization part; 8: visualization result; 9: another cryptographic block identification apparatus; 10: execution file; 11: execution trace acquisition part; 12: communication log; 13: communication log analysis part; 14: analysis result

The invention claimed is:

1. A cryptographic block identification apparatus comprising:

a memory; and processing circuitry configured to acquire an execution trace by executing an execution file of malware;

analyze the execution trace;

calculate an evaluation value representing cipher likeliness of the execution step based on whether or not an operation type that characterizes cipher likeliness is included in the execution step;

extract an execution step where the evaluation value exceeds a threshold L, as a block candidate which is a candidate of a cryptographic block;

identify a region of the execution trace in which block candidates are consecutive beyond a threshold M, as a cryptographic block;

analyze a communication log and output an analysis result including a key and a plaintext;

identify a cipher block from among the extracted block candidates;

analyze the communication log using information of the identified cryptographic block; and output the analysis result.

2. The cryptographic block identification apparatus according to claim 1, wherein the processing circuitry is provided with an array related to the execution step, and subtracts an attenuation amount $\delta$ per execution step from each of all elements in the array, the processing circuitry, when the operation type is included in the execution step, adding a value $\alpha$ indicating likelihood of being a cryptographic block, as an element of the array, and totaling all elements in the array, thereby calculating the evaluation value representing cipher likeliness.

3. The cryptographic block identification apparatus according to claim 2, wherein if the array has a structure of a queue and subtraction of the attenuation amount $\delta$ from the queue renders a top element of the queue to 0, the processing circuitry performs a dequeue process to delete the top element.

4. The cryptographic block identification apparatus according to claim 1, wherein the processing circuitry calculates the evaluation value of the execution step based on the operation type being one of arithmetic operation, logic operation, and bit operation.

5. The cryptographic block identification apparatus according to claim 1, wherein the processing circuitry stores the block candidate, stores the block candidate extracted by analyzing the execution trace in a forward direction and a reverse direction, and identifies the cryptographic block for the block candidate stored.

6. The cryptographic block identification apparatus according to claim 5, wherein the memory is provided with a storage region related to the execution step, and wherein the processing circuitry stores a forward-direction evaluation value which is an evaluation value calculated by analyzing the execution trace in the forward direction, adds a reverse-direction evaluation value which is an evaluation value calculated by analyzing the execution trace in the reverse direction, to the forward-direction evaluation value stored in the storage region, extracts an execution step where a sum value of the forward-direction evaluation value and the reverse-direction evaluation value exceeds a threshold L, and stores the extracted execution step as the block candidate.

7. The cryptographic block identification apparatus according to claim 1, wherein the processing circuitry visualizes the evaluation value calculated and representing cipher likeliness of the execution step.

8. The cryptographic block identification apparatus according to claim 1, wherein the processing circuitry extracts, by filtering, the execution steps whose evaluation value exceeds the threshold L from among execution steps for which the evaluation values representing cipher likeliness have been calculated, and provides an input execution trace consisting of the filtered execution steps to additional processing circuitry configured to execute another cryptographic block identification process.

9. A cryptographic block identification method of a cryptographic block identification apparatus which analyzes an execution trace in which an execution step of malware is recorded, and identifies a cryptographic block, the cryptographic block identification method comprising:

acquiring an execution trace by executing an execution file of malware;

analyzing the execution trace;

calculating an evaluation value representing cipher likeliness of the execution step based on whether or not an operation type that characterizes cipher likeliness is included in the execution step;

extracting an execution step where the evaluation value exceeds a threshold L, as a block candidate which is a candidate of a cryptographic block;

identifying a region of the execution trace in which the block candidates are consecutive beyond a threshold M, as a cryptographic block;

analyzing a communication log and output an analysis result including a key and a plaintext;

identifying a cipher block from among the extracted block candidates;

analyzing the communication log using information of the identified cryptographic block; and outputting the analysis result.

10. A non-transitory computer readable recording medium storing a cryptographic block identification program that causes a computer to execute:

acquiring an execution trace by executing an execution file of malware;

analyzing the execution trace;

calculating an evaluation value representing cipher likeliness of the executions step based on whether or not an operation type that characterizes cipher likeliness is included in the execution step;

extracting an execution step where the evaluation value exceeds a threshold L, as a block candidate which is a candidate of a cryptographic block;

identifying a region of the execution trace in which the block candidates are consecutive beyond a threshold M, as a cryptographic block analyzing a communication log and output an analysis result including a key and a plaintext;

identifying a cipher block from among the extracted block candidates;

analyzing the communication log using information of the identified cryptographic block; and outputting the analysis result.

* * * * *